No. 614,002. Patented Nov. 8, 1898.
I. J. JENKINS.
METHOD OF PLANTING SEED.
(Application filed Jan. 21, 1898.)
(No Model.)
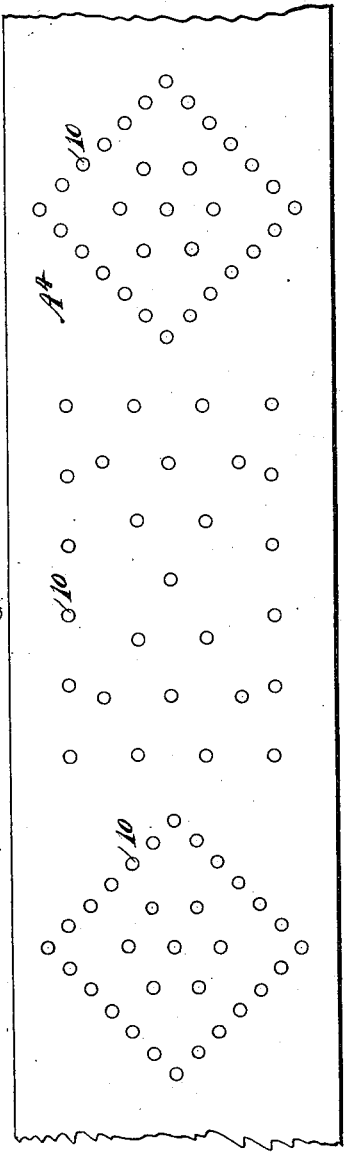
WITNESSES:
INVENTOR
BY
ATTORNEY.

UNITED STATES PATENT OFFICE.

ISAAC J. JENKINS, OF EL PASO, ILLINOIS.

METHOD OF PLANTING SEED.

SPECIFICATION forming part of Letters Patent No. 614,002, dated November 8, 1898.

Application filed January 21, 1898. Serial No. 667,423. (No model.)

*To all whom it may concern:*

Be it known that I, ISAAC J. JENKINS, of El Paso, in the county of Woodford and State of Illinois, have invented a new and Improved Method of Planting Seed, of which the following is a full, clear, and exact description.

My invention relates to an improved method of planting seed; and the objects of the invention are to provide for a more rapid and convenient means of planting than heretofore and to so prepare the seed that the farmer or grower may readily acquire a knowledge of the exact amount of seed required to plant a certain piece of ground, thereby avoiding the purchase of more seed than is necessary, which frequently happens under the usual system of planting.

A further object of the invention is to prepare the seed in such a manner that each seed that is good will come up in the place determined upon for its appearance, and whereby, also, previous to planting the seed may be arranged to produce plants in a predetermined order.

The invention consists in securing seed within a tubular casing consisting of a fabric of loose mesh, the seed being arranged in the order in which it is desired that the plants shall appear and held in the desired position by the elasticity of the fabric, the tubular casing thus prepared being planted in any approved manner.

Reference is to be had to the accompanying drawings, forming a part of this specification, in which similar characters of reference indicate corresponding parts in all the figures.

Figure 1 is a sectional view through a single strip of fabric, illustrating the seed as attached thereto. Fig. 2 is a sectional view through two connected strips of fabric, the seed being placed between the strips. Fig. 3 illustrates a tubular strip of fabric, partly in side elevation and partly in section, and the seed contained therein; and Fig. 4 is a plan view of a strip of fabric, illustrating the seed placed thereon to form designs.

In carrying out the invention, in Fig. 1 a single strip of fabric A is provided of any desired length, upon which the seed 10 are secured by gluing the seed thereto, cementing or otherwise fastening the seed to the strip.

In Fig. 2 two strips $A'$ and $A^2$ are employed, the two strips being attached together in such a manner as to form pockets 11 at predetermined intervals, and the seed 10 are contained within the pockets.

In Fig. 3 the strip $A^3$, adapted to be planted, is a tubular casing of woven material, the weave being quite loose, and at predetermined intervals within this tubular material the seed 10 are contained, the elasticity of the fabric holding the seed in position.

In Fig. 4 the seed 10 are illustrated as placed on a single strip $A^4$ of fabric to form designs of predetermined contour, or the seed may be grouped in designs between sheets. Large sheets, as shown in Fig. 4, could not be planted advantageously in furrows and must be laid where wanted and covered with earth.

I desire it to be understood that the fiber or fabric employed may be paper, cotton, wool, linen, or of any other desired character, and that the shape of the strips may be that of a tape or string, or they may be flat or braided or of any cross-sectional contour.

The strips containing the seed are planted in furrows, and the seed and strips are covered in the usual manner.

Having thus fully described my invention, I claim as new and desire to secure by Letters Patent—

A tubular casing consisting of a fabric of loose mesh, and seed arranged within said tubular casing at predetermined intervals and held in position by the elasticity of the fabric, substantially as set forth.

ISAAC J. JENKINS.

Witnesses:
FRANK B. STELL,
LEWIS K. EVANS.